United States Patent [19]

Hasenauer et al.

[11] 4,415,626

[45] Nov. 15, 1983

[54] ANTISTATIC COMPOSITION AND ELEMENTS AND PROCESSES UTILIZING SAME

[75] Inventors: Charles R. Hasenauer, Rochester; Donald N. Miller, Penfield, both of N.Y.

[73] Assignee: Eastman Kodak Company, Rochester, N.Y.

[21] Appl. No.: 338,401

[22] Filed: Jan. 8, 1982

[51] Int. Cl.[3] ........................ B32B 5/16; B32B 27/36; G03C 1/82

[52] U.S. Cl. .................................... 428/323; 428/327; 428/409; 428/480; 428/483; 428/515; 428/922; 430/124; 430/126; 430/496

[58] Field of Search ............... 428/323, 327, 537, 216, 428/380, 383, 409, 515, 922; 430/496, 126, 17, 635, 8, 124, 47; 427/340

[56] References Cited

U.S. PATENT DOCUMENTS

| | | | |
|---|---|---|---|
| 3,437,484 | 4/1969 | Nadeau | 430/496 |
| 3,535,112 | 10/1970 | Dolce et al. | 430/126 |
| 3,539,340 | 11/1970 | Dolce et al. | 430/126 |
| 3,549,360 | 12/1970 | O'Neill et al. | 430/126 |
| 3,754,924 | 8/1973 | De Geest et al. | 430/635 |
| 3,758,327 | 9/1973 | York et al. | 430/8 |
| 3,850,642 | 11/1974 | Bailey, Jr. et al. | 430/528 |
| 3,854,942 | 12/1974 | Akman | 430/47 |
| 4,071,362 | 1/1978 | Takenaka et al. | 427/340 |
| 4,232,101 | 11/1980 | Fukuda et al. | 428/537 X |
| 4,259,422 | 3/1981 | Davidson et al. | 430/17 |

FOREIGN PATENT DOCUMENTS

| | | | |
|---|---|---|---|
| 1237386 | 6/1971 | United Kingdom | 428/216 |

OTHER PUBLICATIONS

Japan Patent Center, Inc., Jun. 29, 1970, p. 118, Abstract of Japanese Pub. No. 19039/70.

*Primary Examiner*—Thomas J. Herbert, Jr.
*Attorney, Agent, or Firm*—David F. Janci

[57] ABSTRACT

An antistatic composition useful to reduce the propensity of multilayer elements to accumulate static electrical charge comprises an aqueous dispersion of (a) a film-forming binder; (b) a hardener for the binder; (c) a substantially transparent matting agent having particles with a diameter in the range of from about 1 to about 50 microns and a specific gravity substantially the same as that of water; (d) a highly electrically conductive, noncrystallizable conductivity agent; and (e) a charge control agent. This antistatic composition is especially useful as an image-receiving layer on substantially transparent image-receiving elements. Such image-receiving elements can be formed into projection-viewable transparencies by an electrographic copy process, which transparencies are considerably less likely to stick to one another or jam in electrographic copier/duplicator equipment than currently available transparencies.

17 Claims, No Drawings

ANTISTATIC COMPOSITION AND ELEMENTS AND PROCESSES UTILIZING SAME

FIELD OF THE INVENTION

This invention relates to a formulation of chemical compounds useful as an antistatic composition. It also relates to multilayer elements incorporating such antistatic composition, which elements have reduced propensity to accumulate static electrical charge, and to a method of preparing such elements. In a particular aspect, this invention relates to substantially transparent image-receiving elements and a method of preparing same. In a further specific aspect, it relates to projection-viewable transparencies and an electrographic copy process for making same from such image-receiving elements.

BACKGROUND OF THE INVENTION

In the manufacture and use of multilayer elements useful in radiographic, magnetic, electrographic or photographic processes and products, the generation of static electrical charge is a serious problem. In the case of photographic and magnetic products, the most serious deleterious effects are evident when accumulated charge discharges, producing either actinic radiation or "noise" which is recorded as an image on photosensitive products or as static on magnetic products such as magnetic tape. In the case of electrographic products, such discharges can diminish image quality and cause elements to stick to each other or to other surfaces. Static discharge can occur in the course of manufacturing processes (e.g. coating, finishing or packaging) or during customer use (e.g. in cameras, printers, tape recorders, copier/duplicator equipment, etc.).

Accumulation of static electrical charge on elements designed for electrographic use increases the tendency of such elements to stick to each other when stacked together or when being used. Many times, what is known as a "multifeed" occurs when two or more elements, which have been drawn into the electrographic copier/duplicator equipment, stick together and jam in the feeder rollers. Another problem arises when such elements stick to each other or to other surfaces within the equipment during the electrographic copying process. Typically, the element sticks at the fuser station where a toned image on the element is fused and jams that station causing equipment shutdown. Therefore, it is often difficult to feed such elements into and through electrographic copier/duplicator equipment smoothly and reliably.

It has been known for many years that the projection of an image present upon a transparency may serve as an effective means for conveying information to one or more viewers. Such projection-viewable transparencies can be prepared by a number of methods, a common one being transfer electrostatic copying. By this process, an image of fusible toner particles is formed on an image-receiving layer of a transparent image-receiving element. The particles are then fixed to the element in some manner, e.g. by contact with a heated fusing surface. This process usually occurs inside electrographic copier/duplicator equipment (sometimes known as a copier/duplicator), such as that described in, for example, U.S. Pat. No. 4,099,860 (issued July 11, 1978 to Connin). It is apparent that image-receiving elements used in such a process and equipment must contact a variety of components (e.g. rollers, plates, belts, etc.) in such equipment. If any element "sticks" either to any of these components or to another element, it can "jam" up the entire copying process and impede the movement of or cause damage to itself and other elements, thereby greatly increasing equipment maintenance problems.

It has been observed that "multifeeds" and "jams" at the fuser station have been occurring with increasing frequency with currently-available transparent image-forming elements that are utilized in such copier/duplicator equipment. While certain equipment changes can remedy some of the causes of such malfunctions, the number of such malfunctions is still undesirably high. It is believed that these problems are due largely to the accumulation of static electrical charge on the elements. Some users have attempted to reduce the incidence of "multifeeds" by interleaving the transparent image-receiving element with sheets of paper. This, however, results in lower productive use of the copier/-duplicator equipment and additional labor costs for adding and removing the paper sheets.

It is known that static electrical charge build-up can be minimized in multilayer elements (both sensitized and nonsensitized) by including an antistatic layer in such elements. Examples of antistatic compositions used for this purpose are described, for example, in U.S. Pat. No. 3,437,484 (issued Apr. 18, 1969 to Nadeau). Such compositions have resolved the static accumulation problem to a significant degree in many multilayer elements, including transparent image-receiving elements known in the art, such as those described in U.S. Pat. Nos. 3,549,360 (issued Dec. 22, 1970 to O'Neill et al) and 4,259,422 (issued Mar. 31, 1981 to Davidson et al). In Davidson et al, the transparent image-receiving elements are described as having a transparent polymeric support having on one side a hydrophilic colloid-containing image-receiving layer and on the other side the antistatic composition described in the Nadeau patent mentioned previously.

It has been found that, as advances are made in electrographic copier/duplicator equipment design, higher speed electrographic copying is possible. High speed copying is desirable to increase productivity. However, it has been observed that high speed copying using currently-available transparent image-receiving elements has resulted in sharply higher incidences of element "multifeed" and "jams" within the equipment. It has also been observed that projection-viewable transparencies made from such elements cling to each other when they exit the equipment. Hence, they can not be stacked neatly and packaged without tediously pulling each element from the others and restacking. Such problems are believed to be due to higher accumulated static electrical charges on the elements resulting from higher copying speeds. Attempts to reduce these accumulated charges with known antistatic compositions have met with little success.

Hence, there is a need in the art for multilayer elements having a reduced propensity for accumulating static electrical charge, and particularly for transparent image-receiving elements that can be fed and transported smoothly and reliably through electrographic copier/duplicator equipment at high speeds without significant accumulation of static electrical charge.

SUMMARY OF THE INVENTION

The present invention provides multilayer elements, and particularly substantially transparent image-receiving elements, which have a reduced propensity to accumulate static electrical charge. Such image-receiving elements, when used in an electrographic copying process to prepare projection-viewable transparencies, are significantly less susceptible to "multifeeds" and "jams" than conventional elements. Further, the resulting transparencies of this invention do not stick together upon exiting copier/duplicator equipment and can be stacked and packaged with minimal effort.

These advantages are achieved while the problems shown by conventional elements are overcome with the use of the novel antistatic composition of this invention. Many antistatic compositions containing various conductive chemical compounds are known but not every antistatic composition is effective in reducing static accumulation in all types of elements requiring static protection. Many times, an antistatic composition is useful specifically in certain types of elements, or for certain levels of static charge. The novel antistatic composition of this invention, with its specific formulation of specific compounds, has been found to significantly reduce the propensity of multilayer elements to accumulate static electrical charge under circumstances where other compositions have failed.

In accordance with this invention, there is provided an antistatic composition comprising an aqueous dispersion of (a) a film-forming binder; (b) a hardener for the binder; (c) a substantially transparent matting agent having particles with a diameter in the range of from about 1 to about 50 microns and a specific gravity substantially the same as that of water; (d) a highly electrically conductive, noncrystallizable conductivity agent; and (e) a charge control agent.

This invention also provides a multilayer element having reduced propensity to accumulate static electrical charge. Such an element comprises a support having on at least one side thereof, a non-tacky, electrically conductive layer with a surface resistivity of from about $1\times10^{7}$ to about $1\times10^{12}$ ohms per square when measured at 21° C. and 50% relative humidity (R.H.). This electrically conductive layer comprises (a) a film-forming binder; (b) a hardener for the binder; (c) a substantially transparent matting agent having particles with a diameter in the range of from about 1 to about 50 microns; (d) a highly electrically conductive, noncrystallizable conductivity agent; and (e) a charge control agent in an amount sufficient to reduce triboelectric charging of the layer to less than about +15 microcoulombs per square meter.

Further, this invention comprises a method for providing the just-described multilayer element. Such method comprises the steps of (1) forming a layer on at least one side of a support with the antistatic composition of this invention; and (2) rendering such antistatic layer dry and non-tacky.

Additionally, this invention encompasses both an electrographic copy process for forming a projection-viewable transparency and the transparency formed thereby. This process comprises the steps of (1) forming a toned image of fusible toner particles on an image-receiving layer of a substantially transparent image-receiving element; and (2) fusing the toner particles to the image-receiving layer. Such image-receiving element comprises a substantially transparent polymeric support having on one side the image-receiving layer and on the opposite side an antistatic layer. Each of these layers has a surface resistivity of from about $1\times10^{10}$ to about $1\times10^{12}$ ohms per square when measured at 21° C. and 50% R.H. Also, each layer comprises (a) a film-forming binder; (b) a hardener for the binder; (c) a substantially transparent matting agent having particles with a diameter in the range of from about 2 to about 25 microns, (d) a highly electrically conductive, noncrystallizable conductivity agent; and (e) a charge control agent in an amount sufficient to reduce triboelectric charging of each layer to less than about +15 microcoulombs per square meter.

DESCRIPTION OF THE PREFERRED EMBODIMENTS

The antistatic composition of this invention is an aqueous-based composition. Typically, water is the only liquid in the composition. However, mixtures of water and water-miscible organic solvents (e.g. alcohols, such as methanol and isopropanol and ketones such as acetone) can be used as long as water comprises at least 50 percent, by weight, of the mixture. The term "aqueous dispersion" is utilized herein to encompass total or partial solubilization of some of the components of the composition. Typically, some of the components will be dissolved or solubilized in the water, while others (e.g. the matting agent) will be dispersed therein.

The film-forming binder useful in the antistatic composition of this invention can be any binder which can be applied to a substrate in a suitable manner to form a non-tacky film. Typically, the binders useful in this invention are those which are naturally non-tacky when so applied or which can be hardened to eliminate any tackiness. Such binders are known in the art and described, for example, in *Research Disclosure,* publication 17643, paragraph IX, (published December, 1978 by Industrial Opportunities, Ltd., Homewell, Havant Hampshire P09 1EF, United Kingdom) and include both natural and synthetic, colloidal and resin materials. They can be used alone or in combination. Preferably, the binder is a synthetic polymer resin binder, such as poly(vinyl alcohol) or a derivative thereof, poly(vinyl acetate), carboxy methylcellulose or carboxymethyl hydroxyethylcellulose. More preferably, the resin binder is poly(vinyl alcohol). The binders useful in the practice of this invention are either readily available from commercial sources or readily prepared by techniques known in the art. The binders can be mixed with inorganic materials, such as silica, which also act as binders but which are not necessarily film-forming.

The hardener useful in the antistatic composition of this invention can be any suitable hardener which will render the particular binder used non-tacky in film form. Such hardeners are well known in the art and are either commercially available or easily prepared by known methods. They can be used alone or in combination and in free or blocked form. Useful hardeners include Werner chromium complex compounds, chromium halides and sulfates, aldehydes, epoxy-containing compounds, haloethylsulfonyls, bis(vinylsulfonyl)s, zirconium nitrate, and others described, for example, in *Research Disclosure,* publication 17643, paragraph X, mentioned previously. Preferred hardeners for use in this invention include highly reactive Werner chromium compounds (e.g. methacrylatochromic chloride available as VOLAN™ from DuPont Co., Wilmington, Delaware). When poly(vinyl alcohol) is used as the binder, the preferred hardener is methacrylatochromic chloride.

The antistatic compositions of this invention also include a substantially transparent matting agent which improves surface lubricity of the applied antistatic composition. As used throughout this specification and in the claims, the term "substantially transparent" when used in relation to the matting agent, or any other part of an element, means that essentially all (greater than about 90 percent) light incident on an object passes through that object. Although the size of the particles of the matting agent can vary widely, preferably the particles are of substantially uniform size. Typically, the particles have a curvilinear surface and most preferably are substantially spherical beads. Generally, these particles have a diameter in the range of from about 1 to about 50, preferably from about 2 to about 25, and more preferably from about 8 to about 12, microns. Where the particles are not spherical, this diameter refers to the dimension of the major axis.

The matting agent useful in this invention exhibits little or no swelling (i.e. less than about 20%, preferably less than about 10% swell) in the aqueous medium it is dispersed in. Further, the matting agent has a specific gravity substantially the same as that of the aqueous medium (i.e. about 1). When the specific gravity of the matting agent is so matched, the particles of the matting agent are often referred to as "neutral bouyancy" particles. Use of neutral bouyancy particles facilities the uniform dispersion of the matting agent throughout the aqueous medium and correspondingly, throughout the coated antistatic layer and prevents settling in the medium.

The particles of the matting agent described herein can be composed of a wide variety of organic polymers, including both natural and synthetic polymers having the requisite transparency, non-swellability and specific gravity. The polymers can be addition polymers (e.g. polystyrenes, polyacrylates, etc.) or condensation polymers (e.g. polyesters, polycarbonates, polyamides, silicone polymers, etc.). Preferably, the matting agent particles are composed of addition polymers (i.e. homopolymers and copolymers) prepared from one or more ethylenically unsaturated polymerizable monomers. The matting agent can comprise either particles of one polymer or a mixture of particles of several polymers.

The polymers of which the particles are composed can be prepared by any of a variety of conventional polymerization methods. Typical addition polymerization methods include: solution polymerization (followed by appropriate precipitation procedure, if necessary); suspension polymerization (sometimes called bead polymerization); emulsion polymerization; dispersion polymerization; and precipitation polymerization. Condensation polymers can be prepared by conventional condensation polymerization processes (e.g. bulk and hot melt polymerization).

Although the present invention is not so limited, particularly useful polymers for preparing the matting agent described herein are addition polymers prepared from at least one of the following ethylenically unsaturated polymerizable monomers:

a. Up to 100, preferably up to about 99, weight percent of an amino-free styrene, including derivatives and equivalents thereof, such as a monomer having the formula

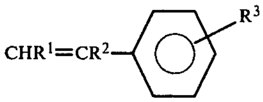

wherein each of $R^1$ and $R^2$, which can be the same or different, is a non-interfering substituent such as hydrogen, halo (e.g. fluoro, chloro or bromo) or substituted or unsubstituted, amino-free alkyl or aryl having from 1 to about 10 carbon atoms (e.g. methyl, ethyl, t-butyl, phenyl, methylphenyl, etc.); and $R^3$ is a non-interfering substituent such as hydrogen, halo (e.g. fluoro, chloro or bromo), or a substituted or unsubstituted, amino-free aliphatic or aromatic group having from 1 to about 10 carbon atoms, e.g. alkyl, alkoxy, aryl, or aryloxy. Typical of such styrene monomers are styrene, vinyltoluene and t-butylstyrene.

b. Up to about 25, preferably up to about 20, weight percent of an acrylic acid ester, including derivatives and equivalents thereof, such as an acrylic acid ester having the formula $CHR^1{=}CH{-}COOR^4$ wherein $R^1$ is as defined above and $R^4$ is a hydrocarbon having from 1 to about 10 carbon atoms, such as aryl (e.g. phenyl), alkyl (e.g. methyl, ethyl, chloromethyl, t-butyl), alkaryl (e.g. benzyl, 2-ethylenephenyl) and aralkyl (e.g. xylyl).

c. Up to 100, preferably up to about 75, weight percent of a methacrylic acid ester including derivatives and equivalents thereof, such as a methacrylic acid ester having the formula

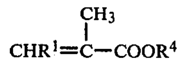

wherein $R^1$ and $R^4$ are as defined above.

d. Up to about 30, preferably up to about 25, weight percent of a carboxylic acid containing one or more ethylenically unsaturated polymerizable groups, such as methacrylic acid, acrylic acid, crotonic acid and itaconic acid.

e. Up to about 75, preferably up to about 50, weight percent of a nitrile containing one or more ethylenically unsaturated polymerizable groups, such as acrylonitrile, methacrylonitrile, and equivalents.

f. Up to about 20, preferably up to about 15, weight percent of amino-substituted styrene monomer, including styrene monomers having N-alkyl substituted amino substituents on the phenyl ring of the styrene monomers, such amino-substituted styrene monomers typically having the formula

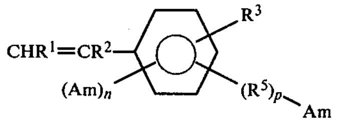

wherein each of n and p, which can be the same or different, is 0 or 1, $R^1$, $R^2$ and $R^3$ are as defined above, $R^5$ is alkylene having from 1 to about 6 carbon atoms (e.g. methylene, ethylene, isopropylene, etc.), and Am is a primary, secondary, or tertiary amino group. Typical of such amine-substituted styrene monomers are N,N-dimethyl-N-vinylbenzylamine and styrenes containing N-alkyl substituted amino substituents, such as N-methylaminoethylstyrene and N,N-dimethylaminoethylstyrene.

g. Up to about 20, preferably up to about 10, weight percent of a monomer containing a crosslinkable group, including
 (1) ethylenically unsaturated polymerizable monomers which can be crosslinked by conventional gelatin hardeners, for example, aldehyde hardeners, haloethylsulfonyl hardeners, bis(vinylsulfonyl) hardeners, and the like. Particularly preferred of such monomers are those containing an active methylene group as described in U.S. Pat. Nos. 3,459,790; 3,488,708; 3,554,987; 3,658,878; 3,929,482; and 3,939,130; and
 (2) ethylenically unsaturated polymerizable monomers which can be crosslinked by diamines, such monomers containing a conventional gelatin hardening group, for example, aldehyde group-containing monomers, haloethylsulfonyl group-containing monomers, vinylsulfonyl group-containing monomers, and the like.

h. Up to about 20, preferably up to about 15, weight percent of a tertiary aminoalkyl acrylate or methacrylate and equivalents thereof, such as dimethylaminoethyl acrylate, diethylaminoethyl methacrylate, etc.

i. Up to 100, preferably up to about 75, weight percent of a polymerizable, N-heterocyclic vinyl monomer and equivalents thereof, such as 4-vinylpyridine, 2-vinylpyridine, etc.

j. Up to about 20, preferably up to about 15, weight percent of an acrylamide or methacrylamide and equivalents thereof, including monomers having the formula $$CHR^1{=}CR^6\overset{O}{\overset{\|}{C}}{-}Am$$

wherein $R^1$ and Am are as defined above and $R^6$ is hydrogen or methyl. Typical of such monomers are N,N-dialkylacrylamide (e.g. N,N-diisopropylacrylamide) or N,N-dialkylmethacrylamide (e.g. N,N-dimethylmethacrylamide).

k. Up to about 20, preferably up to about 5 weight percent, of a crosslinkable monomer containing at least two ethylenically unsaturated polymerizable groups, such as divinylbenzene, N,N-methylenebis-(acrylamide), ethylene diacrylate, ethylene dimethacrylate and equivalents thereof.

A partial listing of particularly useful polymers includes: poly(styrene-co-methacrylic acid) [98:2]; poly(vinyl toluene-co-p-t-butylstyrene-co-methacrylic acid) [61:37:2]; poly(vinyl toluene-co-p-t-butylstyrene-co-methacrylic acid-co-divinylbenzene) [60:37:2:1]; poly(methyl methacrylate); and poly(styrene-co-acrylonitrile). An especially useful polymer is poly(vinyl toluene-co-p-t-butylstyrene-co-methacrylic acid) [61:37:2]. The numbers in the brackets following each of the polymer names represent the weight ratio of monomers from which the polymers are prepared.

Further examples of polymers useful in preparing the matting agent described herein are given in U.S. Pat. Nos. 4,258,001 (issued March 24, 1981 to Pierce et al), the disclosure of which is incorporated herein by reference.

The matting agent particles comprise at least about 75, and preferably at least about 90 weight percent, of the described addition or condensation polymers. The remainder of these particles can be composed of other addenda, e.g. pigments, fillers, etc. provided the requisite transparency is maintained. In preferred embodiments, the particles are composed entirely, i.e. 100 weight percent, of such polymers.

Still another component of the antistatic compositions of this invention is a highly-conductive, noncrystallizable conductivity agent. Any suitable conductivity agent can be used, nonpolymeric and polymeric, as long as it provides sufficient conductivity when used in the antistatic composition and elements of this invention and is noncrystallizable. Such a conductivity agent can be used alone or in combination with others. As used in this specification and in the claims, the term "noncrystallizable" refers to a conductivity agent which does not form crystals on the surface of the coated antistatic composition, thereby keeping the coated product free of "haze."

While not intending to limit the scope of this invention, typical noncrystallizable conductivity agents include ionic polymers or resins. Such polymers can also be called "polyelectrolytes." Ionic polymers can be anionic or cationic, have charged moieties in the backbone of the polymer chain or in pendant groups and be free acids or salts of acids. They can be addition or condensation polymers prepared by conventional techniques such as those techniques described previously with regard to the matting agent.

Useful conductivity agents include cationic polymers, such as the vinylbenzyl quaternary ammonium polymers described in U.S. Pat. No. 4,070,189 (issued Jan. 24, 1978 to Kelley et al); the various quaternary ammonium polymers described in U.K. Pat. No. 1,549,032 (Schoeller, published July 25, 1979) and U.S. Pat. Nos. 3,708,289 (issued Jan. 2, 1973 to Timmerman et al), 3,775,126 (issued Nov. 27, 1973 to Babbitt et al) and 4,222,901 (issued Sept. 16, 1980 to Sinkovitz); and anionic polymers, such as alkali metal and ammonium salts of poly(acrylic acid), poly(methacrylic acid), poly(styrene sulfonic acid)s, poly(vinyl phosphate)s and free acids thereof; salts of a carboxy ester-lactone of an interpolymer of an $\alpha$-$\beta$-dicarboxylic acid (or anhydride) and a vinyl ester of a carboxylic acid, as described in U.S. Pat. No. 3,206,312 (issued Sept. 14, 1965 to Sterman et al); the anionic polymers described in U.S. Pat. No. 3,033,679 (issued May 8, 1962 to Laakso et al) and in the Timmerman et al and Schoeller patents mentioned previously. The disclosures of all of these references are incorporated herein by reference. All of these polymers are readily available commercially or prepared by techniques known to one of ordinary skill in the polymer chemistry art.

In some instances, it is possible for the conductivity agent to also be a binder for the described antistatic composition. In such instances, then, one material would perform the function of two components of the composition.

The anionic conductivity agents described above are preferred for use in the practice of this invention. Of these, polymeric carboxylic acids and their metal and ammonium salts, such as poly(acrylic acid) and poly(methacrylic acid), their substituted equivalents and their alkali and ammonium salts are particularly useful.

In its use here, the term "polymeric" also includes oligomeric compounds. Examples of polymeric carboxylic acids and salts thereof include sodium polyacrylate, potassium polyacrylate, sodium polymethacrylate, potassium poly(α-chloroacrylate), poly(acrylic acid) and ammonium polymethacrylate. TAMOL TM 850 (available from Rohm & Haas, Philadelphia, Pennsylvania) is a preferred conductivity agent.

The antistatic compositions of this invention also comprise a charge control agent, alone or in combination with other charge control agents. As used herein and as described in the art (notably U.S. Pat. Nos. 3,501,653 issued Mar. 17, 1970 to Bailey, Jr. and 3,850,642, issued Nov. 26, 1974 to Bailey, Jr. et al the disclosures of both of which are incorporated herein by reference). a "charge control agent" is a material of known triboelectric charging propensity as determined with the apparatus and method described in the Bailey, Jr. patent. This agent is capable of being incorporated into or coated onto a surface to adjust the triboelectric charging characteristics thereof.

"Charge control agents" are to be distinguished from "conductivity agents" The latter are materials which, due to their hygroscopy or ionic nature, tend to conduct away or bleed off static charges generated by contact between two surfaces, thereby minimizing static charge accumulation. "Charge control agents" are materials which minimize, maximize or adjust to a prescribed level, the propensity of a given surface to generate static electrical charges when contacted with another usually dissimilar surface.

The present invention is not limited to any particular charge control agent. Any charge control agent is useful as long as it provides the desired reduction in triboelectric charging when used in the antistatic composition and elements of this invention. Typical useful charge control agents include these described in the Bailey, Jr. et al patent described previously, and the fluorinated surface active agents (sometimes called surfactants) described in U.S. Pat. Nos. 3,754,924 (issued Aug. 28, 1973 to DeGeest et al) and 3,884,699 (issued May 20, 1975 to Cavallo et al), the disclosures of which are incorporated herein by reference.

The fluorinated surfactants of DeGeest et al are particularly useful, including those having the formula $R_F$—A—X wherein $R_F$ is a partly or wholly fluorinated hydrocarbon chain comprising at least three fluorine atoms. "A" is a chemical bond or a bivalent hydrocarbon group having from 1 to 30 carbon atoms, such as an aliphatic (e.g. alkylene or cycloalkylene), aromatic (e.g. arylene) or mixed aliphatic-aromatic group (e.g. aralkylene or alkarylene) including bivalent groups interrupted by heteroatoms (e.g. oxygen and sulfur), carbonyloxy $(-\overset{O}{\overset{\|}{C}}O-)$ and amide groups $(-\overset{O}{\overset{\|}{C}}NR-$ and $-SO_2NR^7$ wherein $R^7$ is hydrogen or alkyl of 1 to 3 carbon atoms). "X" is a hydrophilic group, such as (1) a hydrophilic nonionic polyoxyalkylene group like a polyoxyethylene of the formula $(-CH_2CH_2O)_nR^8$ wherein $R^8$ is hydrogen or alkyl (branched or linear) of 1 to 5 carbon atoms and n is an integer of from 5 to 20, which polyoxyalkylene can be interrupted by one or more isopropyleneoxy groups; (2) a hydrophilic betaine such as

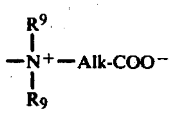 or 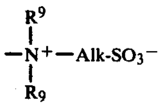

wherein Alk is alkylene (branched or linear) of from 1 to 5 carbon atoms and $R^9$ is alkyl (branched or linear) of from 1 to 5 carbon atoms; or (3) an anionic group such as $-SO_3M$, $-OSO_3M$, $-COOM$, $-OPO_3M$, $-O-PO_3MR^{10}$ or $-PO_3MR^{10}$ wherein M is hydrogen, an alkali metal ion (e.g. sodium or potassium), an ammonium ion (having hydrogen or alkyl groups) or an organic ammonium ion, such as diethanolammonium, morpholinium, pyridinium, etc., and $R^{10}$ is alkyl (branched or linear) of from 1 to 5 carbon atoms or $R_F$.

Of the fluorinated surfactants, the anionic compounds are more preferred, including those wherein $R_F$ is a partly or wholly fluorinated alkyl of from 1 to 12 carbon atoms (e.g. methylene, isopropylene, hexylene, dodecylene, etc.), A is a chemical bond and X is an anionic group, especially a sulfonate. One particularly useful charge control agent, which is commercially available under the name FLUORTENSIDE FT 248 TM from Mobay Chemical Company, Pittsburgh, Pennsylvania, has the formula $CF_3(CF_2)_7SO_3{}^-N(C_2H_5)_4{}^+$.

All of the charge control agents useful in the practice of this invention are either readily available commercially or prepared by techniques known to a worker of ordinary skill in the chemical arts.

The components of the described antistatic composition can be mixed together in any suitable fashion whereby coagulation or agglomeration is avoided. Generally, the individual components are added to the aqueous medium under ambient conditions one at a time with sufficient agitation to disperse or solubilize them and so maintain them. The components are added in small amounts so as to keep the resulting composition relatively dilute. Although it can vary outside this range, generally, the percent solids of the composition is in the range of from about 0.1 to about 20. Preferably, it is from about 0.5 to about 2.5 percent solids, with from about 1.5 to about 2 being more preferred.

In a preferred embodiment, the antistatic composition is prepared by mixing the resin binder and matting agent; dispersing these components in water with suitable agitation; and adding, in order, the charge control agent, the hardener and the conductivity agent, all with good agitation.

Although the amounts of the described components of this antistatic composition can vary widely to achieve desired properties, the typical and preferred amounts are as follows, each based on total composition solids (i.e. dry weight):

(a) The resin binder is present in an amount sufficient to provide a continuous film when applied to a substrate, in which film the other components are substantially homogeneously (i.e. uniformly) distributed. Typically, the resin binder comprises from about 5 to about 80, and preferably, from about 50 to about 70, weight percent.

(b) The hardener is present in an amount sufficient to render the resin binder non-tacky. Typically, it comprises from about 0.5 to about 8, and preferably from about 1 to about 2, weight percent.

(c) The matting agent is present in an amount sufficient to provide the desired surface lubricity and transparency to the applied layer. Typically, the matting agent comprises from about 2 to about 30, and preferably from about 15 to about 25, weight percent.

(d) The conductivity agent is present in an amount effective to render an applied layer of the composition sufficiently conductive so that the layer surface has a surface resistivity of from about $1\times10^7$ to about $1\times10^{12}$ ohms per square, preferably from about $1\times10^{10}$ to about $1\times10^{12}$ ohms per square and more preferably from about $5\times10^{10}$ to about $5\times10^{11}$ ohms per square all measured at 21° C. and 50% R.H. Typically, the conductivity agent comprises from about 2 to about 20, and preferably from about 8 to about 12, weight percent.

(e) The charge control agent is present in an amount sufficient to reduce triboelectric charging of an applied layer of the antistatic composition to less than about ±15 microcoulombs per square meter, and preferably less than about ±5 microcoulombs per square meter. Typically, the charge control agent comprises from about 0.01 to about 0.3, and preferably from about 0.08 to about 0.15, weight percent.

The amount of each component of the antistatic composition can also be characterized by specifying the dry weight coverage of each component in an applied layer of the composition. Typically, such layers have an average thickness in the range of from about 0.05 to about 5 micrometers, and preferably from about 0.1 to about 1 micrometers, depending upon the particular characteristics of the element. It should be understood that the matting agent particles typically protrude beyond the surface of the coated layer, although it is not necessary that they do so in some uses. In such typical layers then, the binder is present in a coverage of from about 5 to about 1600, and preferably from about 50 to about 1400, milligrams per square meter; the hardener is present in a coverage of from about 0.5 to about 160, and preferably from about 1 to about 40, milligrams per square meter; the matting agent is present in a coverage of from about 2 to about 600, and preferably from about 15 to about 500, milligrams per square meter; the conductivity agent is present in a coverage of from about 2 to about 400, and preferably from about 8 to about 240, milligrams per square meter; and the charge control agent is present in a coverage of from about 0.01 to about 6, and preferably from about 0.08 to about 3, milligrams per square meter.

Besides the essential components described hereinabove, the antistatic composition of this invention can also contain one or more of various other addenda common to antistatic compositions, provided such addenda do not adversely affect the desired properties discussed previously in the Summary of the Invention. Such addenda include, but are not limited to, wetting aids, surface active agents, lubricants, colorants, inorganic matting agents, defoamers, biocides and thickeners. These addenda can be present in quantities typically used in the art.

The antistatic compositions of this invention can be used in any multilayer element where there is need to provide conductivity and to reduce the propensity of such element to accumulate static electrical charge. Generally, such multilayer elements include photographic elements (both positive and negative working), including photothermographic, thermographic, radiographic, diffusion or image transfer film units and the like. Examples of such photographic elements include photographic papers, aerial films, micrographic films, graphic arts films and integral or two-sheet diffusion or image transfer products. The characteristics and components of such products are known in the art which is too voluminous to list. One reference summarizing much of the art, including the various image forming materials and layers, is *Research Disclosure*, publication 17643, cited previously. This invention also encompasses electrographic elements. Such elements include electrostatographic, electrophotographic and xerographic elements. Again, the art describing such products is too voluminous to list here. One reference describing some of these elements, including image-forming materials and layers is *Research Disclosure*, publication 10938, pp. 61-67, May, 1973.

The multilayer elements of this invention typically have a support layer and one or more other layers thereon. Sometimes such support layers are simply called supports. Typical supports include polymeric films, wood fiber or cellulosic substrates (e.g. paper), metallic sheets and foil, glass, and ceramic substrates. Typical of useful cellulosic supports are paper supports having a baryta or polymeric (e.g. polyolefinic) coating thereon.

Preferably, the support is a transparent polymeric film. Typical useful polymeric films include cellulose nitrate; cellulose esters (e.g. cellulose triacetate); polystyrene; polyamides; polymers prepared from vinyl chloride; polyolefins (e.g. polyethylene); polycarbonates; polyacrylates; polysulfones; polyamides and polyesters of dibasic aromatic carboxylic acids with divalent alcohols. A particularly useful polymeric support is a poly(ethylene terephthalate) film.

A more detailed description of useful supports and methods of making same is provided in *Research Disclosure*, publication 17643, paragraph XVII, cited previously herein and the references mentioned therein.

The antistatic composition of this invention can be applied to one or both sides of the support, but preferably, both sides, to form electrically conductive layers having the desired conductivity and triboelectric charging characteristics. The composition can be applied or located on the supports by any of a number of suitable procedures, including immersion or dip coating, roller coating, reverse roll coating, air knife coating, doctor blade coating, gravure coating, spray coating, extrusion coating, bead coating, stretch-flow coating and curtain coating. Applied layers can be dried by any suitable evaporation technique. Descriptions of coating and drying techniques are given in *Research Disclosure*, publication 17643, paragraph XV, cited hereinabove and the references mentioned therein.

The resistivity of the resulting electrically conductive layer can be measured by any suitable technique. One such technique is described is ASTM Standard C59.3, designation D257-75 entitled "Standard Methods of Test for D-C Resistance or Conductance of Insulating Materials", pp. 66-85, published Feb. 28, 1975. U.S. Pat. No. 3,525,621 (issued Aug. 25, 1970 to Miller) also discusses measurement of surface resistivities of coated layers. The triboelectric charging characteristics can also be measured by any suitable technique. One technique is known in the art as the "impact electrification" method, as described in U.S. Pat. Nos. 3,501,653 and 3,850,642, cited previously herein. Generally, in this method, the propensity of a given surface to generate static electrical charge is measured relative to another standard surface, such as polyurethane or stainless steel.

Optionally, the multilayer elements of this invention can comprise additional layers, such as subbing, antihalation, adhesive and protective layers, as known in the art. Preferably, the elements contain one or more subbing layers between the support and the electrically conductive layers. Any suitable subbing material can be used including those described, for example, in U.K. Pat. No. 1,463,727 (published Feb. 9, 1977) and U.S. Pat. Nos. 2,627,088 (issued Feb. 3, 1953 to Alles et al), 2,943,937 (issued July 5, 1960 to Nadeau et al), 3,271,345 (issued Sept. 6, 1966 to Nadeau et al), 3,437,484 (issued Apr. 8, 1969 to Nadeau), 3,501,301 (issued Mar. 17, 1970 to Nadeau et al) and 3,919,156 (issued Nov. 11, 1975 to Khanna et al) the disclosures of which are incorporated herein by reference. Particularly useful subbing materials are those prepared from vinylidene chloride copolymers, including poly(vinylidene chloride-co-methyl acrylate-co-itaconic acid) and poly(acrylonitrile-co-vinylidene chloride-co-acrylic acid). The typical thicknesses of subbing layers and methods of applying them to the supports are known in the art.

The multilayer elements of this invention can be image-receiving or image-forming elements. Image-forming elements typically have one or more image-forming layers having components generally known to provide such a function, such as silver halide emulsions, photoconductors and the like. Typical image forming elements are described, for example, in *Research Disclosures,* publications 10938 (May, 1973); 15162 (November, 1976); 17029 (June, 1978); and 17643 (December, 1978). Image-receiving elements typically "receive" an image and can be used as receivers in, for example, integral image transfer film units or two-sheet instant film products, including those sometimes called "peel apart" products and those described in U.S. Pat. Nos. 4,296,195 (issued Oct. 20, 1981 to Bishop et al), and 4,297,432 (issued Oct. 27, 1981 to Bowman et al).

A preferred embodiment of this invention is a substantially transparent image-receiving element having reduced propensity to accumulate static electrical charge. This element is particularly useful for "receiving" images in electrographic copying processes. Such an element comprises a substantially transparent polymeric support having on each side thereof a non-tacky, electrically conductive layer with a surface resistivity of from about $1\times10^{10}$ to about $1\times10^{12}$ ohms per square when measured at 21° C. and 50% R.H. Each electrically conductive layer comprises (a) a film-forming binder; (b) a hardener for the binder; (c) a substantially transparent matting agent having particles with a diameter in the range of from about 2 to about 25 microns; (d) a highly electrically conductive, noncrystallizable conductivity agent; and (e) a charge control agent in an amount sufficient to reduce triboelectric charging of each electrically conductive layer to less than about $\pm15$ microcoulombs per square meter.

In such an image-receiving element, the preferred components and properties of the image-receiving layer are those described previously with regard to the multilayer elements of this invention as long as the image-receiving element has the requisite transparency. Preferably, the element has a subbing layer between the support and each image-receiving layer. Since the element has an image-receiving layer on each side of the support, either side can be used to receive an image. Typically the layer on one side is used to receive an image while the layer on the other side is used as an antistatic layer.

A particular preferred substantially transparent image-receiving element has a substantially transparent polymeric support (e.g. a poly(ethylene terephthalate) film). On each side of the support, outwardly, is a subbing layer and a non-tacky, electrically conductive layer with a surface resistivity of from about $5\times10^{10}$ to about $5\times10^{11}$ ohms per square when measured at 21° C. and 50% R.H. Each electrically conductive layer comprises (a) poly(vinyl alcohol); (b) methacrylatochromic chloride; (c) a substantially transparent matting agent having particles with a diameter in the range of from about 8 to about 12 microns and comprising an addition polymer prepared from at least one ethylenically unsaturated polymerizable monomer; (d) an alkali metal salt of a polymeric carboxylic acid; and (e) an ammonium salt of a fluorinated alkyl sulfonic acid in an amount sufficient to reduce triboelectric charging of the layer to less than about $+5$ microcoulombs per square meter.

The described substantially transparent image-receiving element can be prepared in a manner similar to that described hereinabove for the other multilayer elements of this invention, namely (1) forming a layer on each side of a substantially transparent polymeric support with the antistatic composition of this invention; and (2) rendering each layer dry and non-tacky.

The substantially transparent image-receiving element of this invention can be used in an electrographic copy process to prepare a projection-viewable transparency. Like the image-receiving element, this transparency has reduced static and can be readily stacked and handled without one transparency sticking to another.

Such electrographic copy processes are known in the art, as described, for example, in U.S. Pat. Nos. 3,549,360 (issued Dec. 22, 1970 to O'Neill et al); 3,854,942 (issued Dec. 17, 1974 to Akman) and 4,259,422 (issued Mar. 31, 1981 to Davidson et al), the disclosures of which are incorporated herein by reference. An electrographic copy process is also known as "xerographic reproduction" or "electrostatic copying."

The electrographic copy process of this invention typically employs an electrophotographic element comprising a support bearing a coating of a normally insulating material. The electrical resistance of the insulating material, moreover, varies with the amount of incident actinic radiation it receives during imagewise exposure. The element is first given a uniform surface charge, generally in the dark. It is then exposed to a pattern of actinic radiation which reduces the potential of the surface charge in accordance with the relative energy contained in various parts of the radiation pattern. The differential surface charge (sometimes known as an electrostatic latent image) remaining on the element is then transferred to the image-receiving layer of the substantially transparent image-receiving element of this invention, as described previously.

Image transfer is generally carried out by contacting the insulating surface of the exposed electrophotographic element with the surface of the image-receiving layer. An electric field is established between these surfaces and the electrostatic charge is transferred to the image-receiving layer where it is trapped. The transferred latent image is then made visible by contacting the surface of the image-receiving layer with fusible toner particles. Such toner, whether contained in an insulating liquid or on a dry carrier, can be deposited on the image-receiving element either in the areas where there is an electrostatic charge or in the areas where the charge is absent.

As previously indicated, the toned image employed comprises particles of a fusible, typically resinous, material which is fixed to the image-receiving layer of the image-receiving element by the application of heat in a suitable manner (conductive, convective or radiation source). Typically, the toned layer is brought into contact with a heated fuser surface, such as a heated fuser roller, where heat is applied to soften the toner particles, thereby fusing the image to the image-receiver element.

The temperature of the fuser surface can vary widely depending on such factors as the type of toner used and the duration of contact between the image-receiving element and the heated surface. In general, the temperature is in the range of from about 160° to about 210° C., and preferably from about 170° to about 190° C.

Typical fuser surfaces are described in *Product Licensing Index,* Vol. 99, publication 9944, July, 1972, pp. 72–73; and *Research Disclosure,* publication 16730, March, 1978, pp. 76–77 (both published by Industrial Opportunities, Ltd., Homewell, Havant Hampshire PO9 1EF, United Kingdom). The heated surface can be coated with a suitable release liquid to inhibit transfer of toner particles onto the roll during fusing as described, for example, in U.S. Pat. No. 4,259,422 (issued Mar. 31, 1981 to Davidson et al).

Fusible toner particles that are suitable for forming a visible toned image can comprise a variety of known, mostly resinous, materials including natural and synthetic resins. Examples of useful toner materials are given in the Davidson et al patent mentioned previously and references cited therein.

Any suitable electrophotographic element can be used to transfer a latent image to the image-receiving element of this invention. A description of typical electrophotographic elements is given in each of U.S. Pat. Nos. 4,232,101 (issued Nov. 4, 1980 to Fukuda et al); 4,250,237 (issued Feb. 10, 1981 to Vickers) and references cited therein.

Any suitable electrographic copying/duplicator equipment can be used in the copying process of this invention. An example of such equipment is described in U.S. Pat. No. 4,099,860 (issued July 11, 1978 to Connin).

The following examples are included to further illustrate the invention.

EXAMPLE 1

This is a comparative example comparing a transparent image-receiving element of the present invention to two transparent image-receiving elements outside the scope of the present invention.

The element of this invention was prepared by coating (at a dry weight coverage of about 0.25 g/m$^2$) both sides of a poly(ethylene terephthalate) support (which was subbed on both sides with a copolymer of acrylonitrile, vinylidene chloride and acrylic acid) with an antistatic composition of this invention having the following components:

| | parts per hundred |
|---|---|
| poly(vinyl alcohol) binder | 1.25 |
| methacrylatochromic chloride hardener | 0.031 |

-continued

| | parts per hundred |
|---|---|
| poly(vinyltoluene-co-p-t-butylstyrene-co-methacrylic acid) [61:37:2 weight ratio] matting agent | 0.4 |
| TAMOL TM 850 conductivity agent | 0.2 |
| $CF_3(CF_2)_7SO_3$—$N(C_2H_5)_4$ + charge control agent | 0.002 |
| water | 98.117 |

The coated layers were then dried by a conventional drying technique.

The Control elements A and B each comprised a poly(ethylene terephthalate) support subbed on both sides with a copolymer of acrylonitrile, vinylidene chloride and acrylic acid. One side of the subbed support of each Control element had an antistatic layer comprising poly(vinyl alcohol) binder, a hardener for the binder, an inorganic salt and a matting agent, similar to the antistatic compositions described in U.S. Pat. No. 3,437,484 (issued Apr. 8, 1967 to Nadeau).

On the other side of the subbed support, Control A had an image-receiving layer like that of Example 1 except that gelatin was used in place of poly(vinyl alcohol), formaldehyde was used as the hardener instead of methacrylatochromic chloride and sodium nitrate was used as conductivity agent instead of TAMOL TM 850. Control B had an image-receiving layer also like that of Example 1 except that sodium nitrate was used in place of sodium polymethacrylate as conductivity agent.

The surface resistivity of several samples of each element was determined at different concentrations of conductivity agent. Resistivity was measured according to ASTM standard C59.3 described previously herein. The average resistivities obtained from these tests are given in Table I.

TABLE I

| Concentration of Conductivity Agent (% of wet weight) | | Surface Resistivity (21° C., 50% R.H.) [Log (ohms/sq)] |
|---|---|---|
| 0 | Example 1 | 13.8 |
| | Control B | 13.8 |
| | Control A | 14.8 |
| 0.1 | Example 1 | 12.0 |
| | Control B | 12.6 |
| | Control A | 13.8 |
| 0.2 | Example 1 | 10.8 |
| | Control B | 11.6 |
| | Control A | 13.1 |
| 0.3 | Example 1 | 9.9 |
| | Control B | 11.1 |
| | Control A | 12.5 |
| 0.4 | Example 1 | 9.3 |
| | Control B | 10.8 |
| | Control A | 12.0 |
| 0.5 | Example 1 | 8.9 |
| | Control B | 10.5 |
| | Control A | 11.6 |
| 0.6 | Example 1 | 8.7 |
| | Control B | 10.4 |
| | Control A | 11.2 |
| 0.7 | Example 1 | 8.6 |
| | Control B | 10.4 |
| | Control A | 10.9 |

From the data presented in Table I, it is evident that the antistatic composition of this invention provided significantly improved conductivity for the transparent image-receiving element over the Control compositions. In addition, it was noted that Control B had some haze at higher levels of sodium nitrate whereas Example 1 exhibited no haze at any concentration of conductivity agent. It should be noted also that the antistatic composition of Example 1 was used on both sides of the element whereas the antistatic layer and image-receiving layer of each Control element were different.

EXAMPLE 2

This is a comparative example illustrating the significant reduction in "multifeeds" and "jams" achieved in copier/duplicator equipment with the transparent image-receiving elements of this invention over similar elements known in the art.

A transparent image-receiving element according to this invention was prepared in the manner described in Example 1. Another transparent image-receiving element was prepared as described in U.S. Pat. No. 4,259,422 (issued Mar. 31, 1981 to Davidson et al) and called Control C. This element had an image-receiving layer containing gelatin and an antistatic layer on the opposite side of the support like that used in Controls A and B.

The performance of these elements in conventional copier/duplicator equipment was evaluated in the following manner.

Approximately 25 transparent image-receiving elements of both Example 2 and Control C were placed in the supply box of two separate, but identical, KODAK EKTAPRINT TM copier/duplicators. Twenty-five transparencies from each of Example 2 and Control C elements were made, five from each of 5 different images (some light, some normal, some dark images). The resulting transparencies were evaluated for image quality and the copy process was evaluated for the frequency of "multifeeds" as well as "jams" at the fuser station. This procedure was performed four times each day for two consecutive days intermittently over a period of several months so that hundreds of transparencies were made from both Example 2 and Control C elements.

In all transparencies, the image quality was acceptable although it was somewhat improved for the transparencies provided by this invention. The significant improvement evident was the reduction in frequency of "multifeeds" and "jams" for Example 2 transparencies over Control C transparencies. Frequency is defined as the decimal fraction of the total elements tested which resulted in malfunctions. The smaller the fraction, the less malfunctions occurred.

For the Control C elements, the frequency varied over a period of several months from about 0.04 to about 0.1. In contrast, the frequency for Example 2 elements was consistently about 0.0067. In another way of looking at it, for Control C transparencies, a malfunction occurred for about 1 out of every 10 to 25 tested, whereas a malfunction occurred for only about 1 out of every 250 Example 2 transparencies tested.

Additionally, upon exiting the copier/duplicator, Control C transparencies had considerable static and tended to stick together and could not be stacked neatly with ease upon exiting the copier/duplicator. Example 2 transparencies, however, had little static and tendency to stick together upon exiting the copier/duplicator and could be easily stacked.

This example illustrates the significant improvements obtained with the antistatic composition, elements and transparencies of this invention over those known in the art.

This invention has been described with particular reference to certain preferred embodiments. However, it will be understood that variations and modifications can be effected within the spirit and scope of the invention.

What is claimed is:

1. A substantially transparent electrographic image-receiving element comprising a substantially transparent polymeric support having on each side thereof a non-tacky, electrically conductive layer, each of said electrically conductive layers comprising (a) a film-forming binder; (b) a hardener for said binder; (c) a substantially transparent matting agent having particles with a diameter in the range of from about 1 to about 50 microns; (d) a highly electrically conductive, noncrystallizable conductivity agent; and (e) a charge control agent.

2. The electrographic image-receiving element of claim 1 having a subbing layer between said support and each of said electrically conductive layers.

3. The electrographic image-receiving element of claim 1, wherein each of said electrically conductive layers has a surface resistivity of from about $1\times10^{10}$ to about $1\times10^{12}$ ohms per square when measured at 21° C. and 50% R.H.

4. The electrographic image-receiving element of claim 1, wherein each of said electrically conductive layers has a surface resistivity of from about $5\times10^{10}$ to about $5\times10^{11}$ ohms per square when measured at 21° C. and 50% R.H.

5. The electrographic image-receiving element of claim 1, wherein said binder is a synthetic polymer resin selected from the group consisting of poly(vinyl alcohol), poly(vinyl acetate), carboxymethylcellulose and carboxymethyl hydroxyethylcellulose.

6. The electrographic image-receiving element of claim 1, wherein said hardener is a Werner chromium complex.

7. The electrographic image-receiving element of claim 1, wherein said matting agent particles comprise an addition polymer prepared from an ethylenically unsaturated polymerizable monomer.

8. The electrographic image-receiving element of claim 1, wherein said matting agent particles are substantially spherical and have a diameter in the range of from about 2 to about 25 microns.

9. The electrographic image-receiving element of claim 1, wherein said matting agent particles are substantially spherical and have a diameter in the range of from about 8 to about 12 microns.

10. The electrographic image-receiving element of claim 1, wherein said conductivity agent comprises an anionic polymer.

11. The electrographic image-receiving element of claim 1, wherein said conductivity agent is a polymeric carboxylic acid or alkali metal or ammonium salt thereof.

12. The electrographic image-receiving element of claim 1, wherein said charge control agent is an anionic fluorinated surface active agent.

13. The electrographic image-receiving element of claim 1, wherein said charge control agent is a fluorinated alkyl sulfonate.

14. A substantially transparent electrographic image-receiving element comprising a substantially transparent polymeric support having on each side, in order outward from said support, a subbing layer and a non-tacky, electrically conductive layer with a surface resistivity of from about $5 \times 10^{10}$ to about $5 \times 10^{11}$ ohms per square when measured at 21° C. and 50% R.H., each of said electrically conductive layers comprising (a) poly(-vinyl alcohol); (b) methacrylatochromic chloride; (c) substantially transparent matting agent particles with a diameter in the range of from about 8 to 12 microns and comprising an addition polymer prepared from at least one ethylenically unsaturated polymerizable monomer; (d) an alkali metal salt of a polymeric carboxylic acid; and (e) an ammonium salt of a fluorinated alkyl sulfonic acid.

15. The electrographic image-receiving element of claim 14, wherein said support is a poly(ethylene terephthalate) film.

16. The electrographic image-receiving element of claim 14, wherein said addition polymer is prepared from at least one of the following ethylenically unsaturated polymerizable monomers:

(a) up to 100 weight percent of an amino-free styrene;

(b) up to about 25 weight percent of an acrylic acid ester;

(c) up to 100 weight percent of a methacrylic acid ester;

(d) up to about 30 weight percent of a carboxylic acid containing one or more ethylenically unsaturated polymerizable groups;

(e) up to about 75 weight percent of a nitrile containing one or more ethylenically unsaturated polymerizable groups;

(f) up to about 20 weight percent of an amine-substituted styrene;

(g) up to about 20 weight percent of monomer containing a crosslinkable group;

(h) up to about 20 weight percent of a tertiary aminoalkyl acrylate or methacrylate;

(i) up to 100 weight percent of an N-heterocyclic vinyl monomer;

(j) up to about 20 weight percent of an acrylamide or methacrylamide; and (k) up to about 20 weight percent of a crosslinkable monomer containing at least two ethylenically unsaturated polymerizable groups.

17. The electrographic image-receiving element of claim 16, wherein said addition polymer is prepared from vinyl toluene, t-butyl styrene and methacrylic acid.

* * * * *